April 2, 1946. I. Z. SMOKER 2,397,570
BALE LOADER
Filed Sept. 5, 1944 5 Sheets-Sheet 1
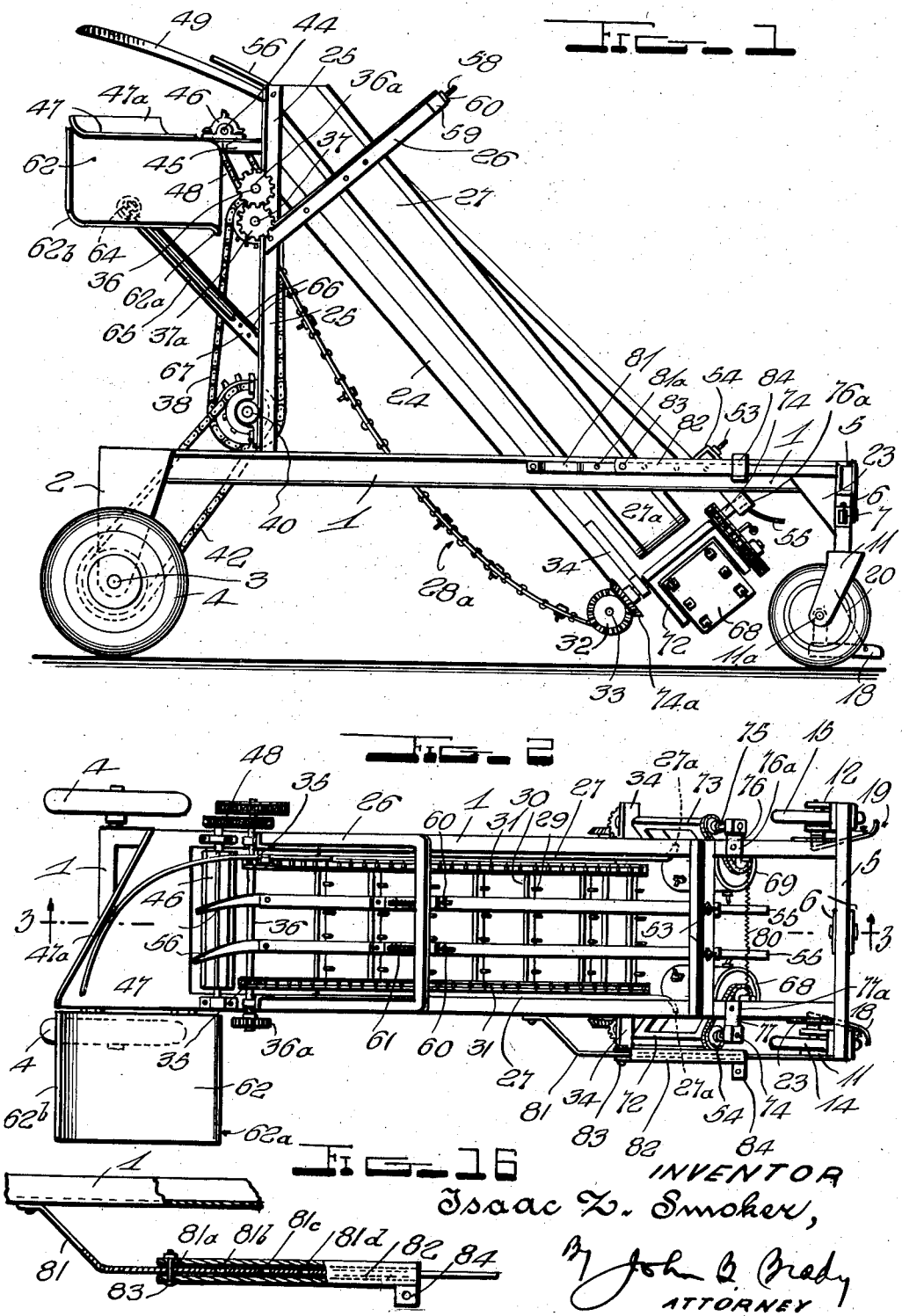
INVENTOR
Isaac Z. Smoker,
By John B. Brady
ATTORNEY

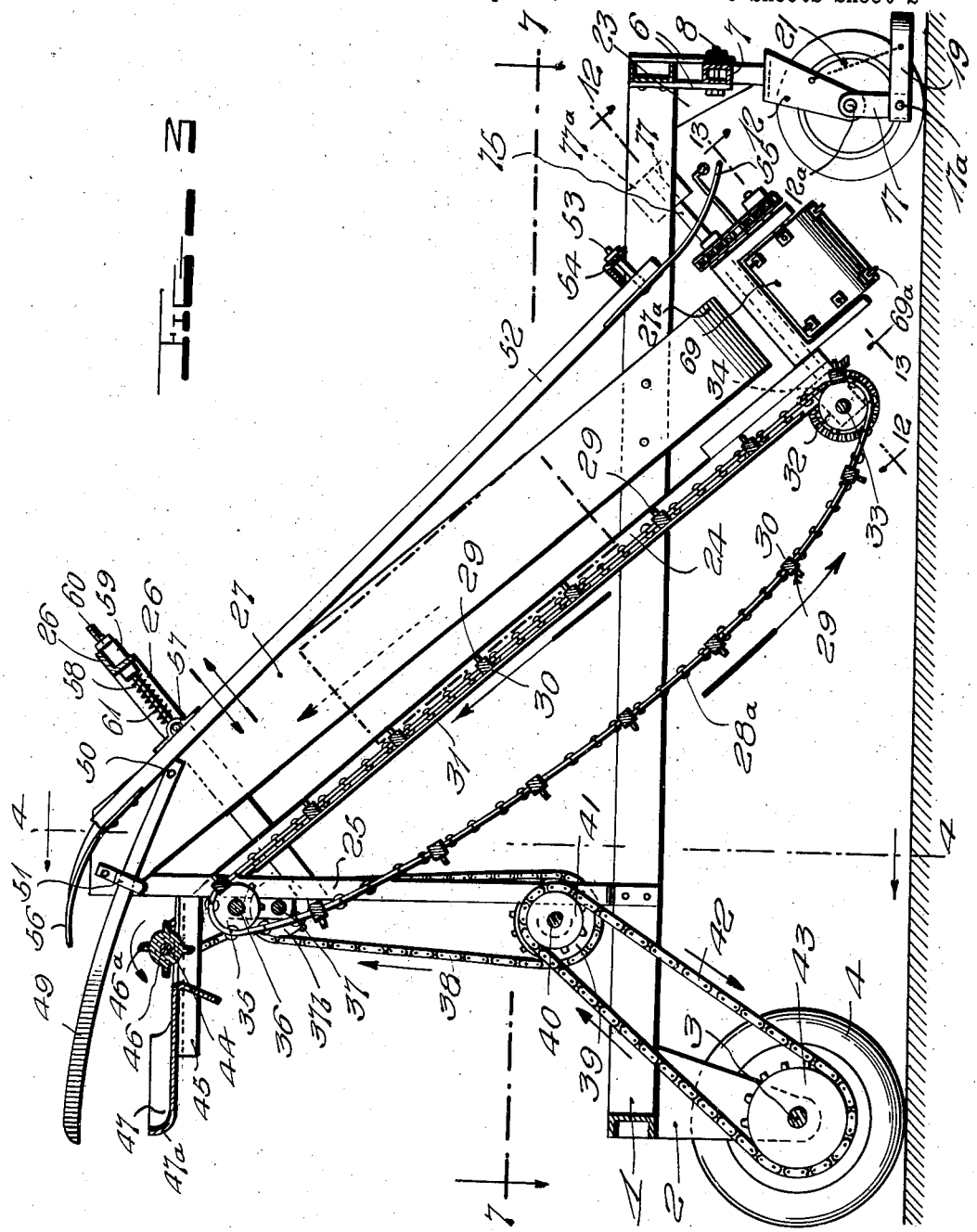

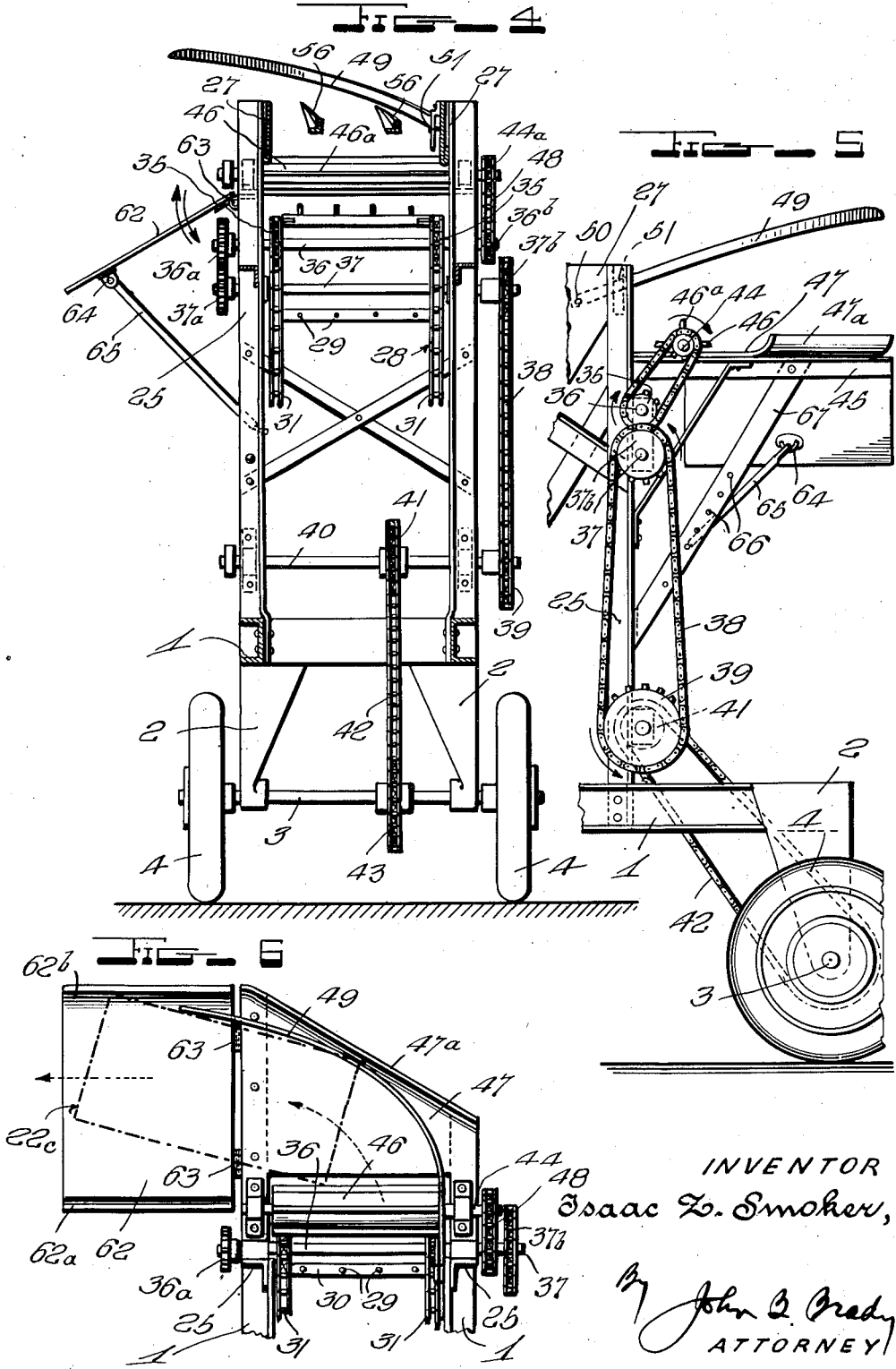

April 2, 1946.　　　I. Z. SMOKER　　　2,397,570
BALE LOADER
Filed Sept. 5, 1944　　　5 Sheets-Sheet 4
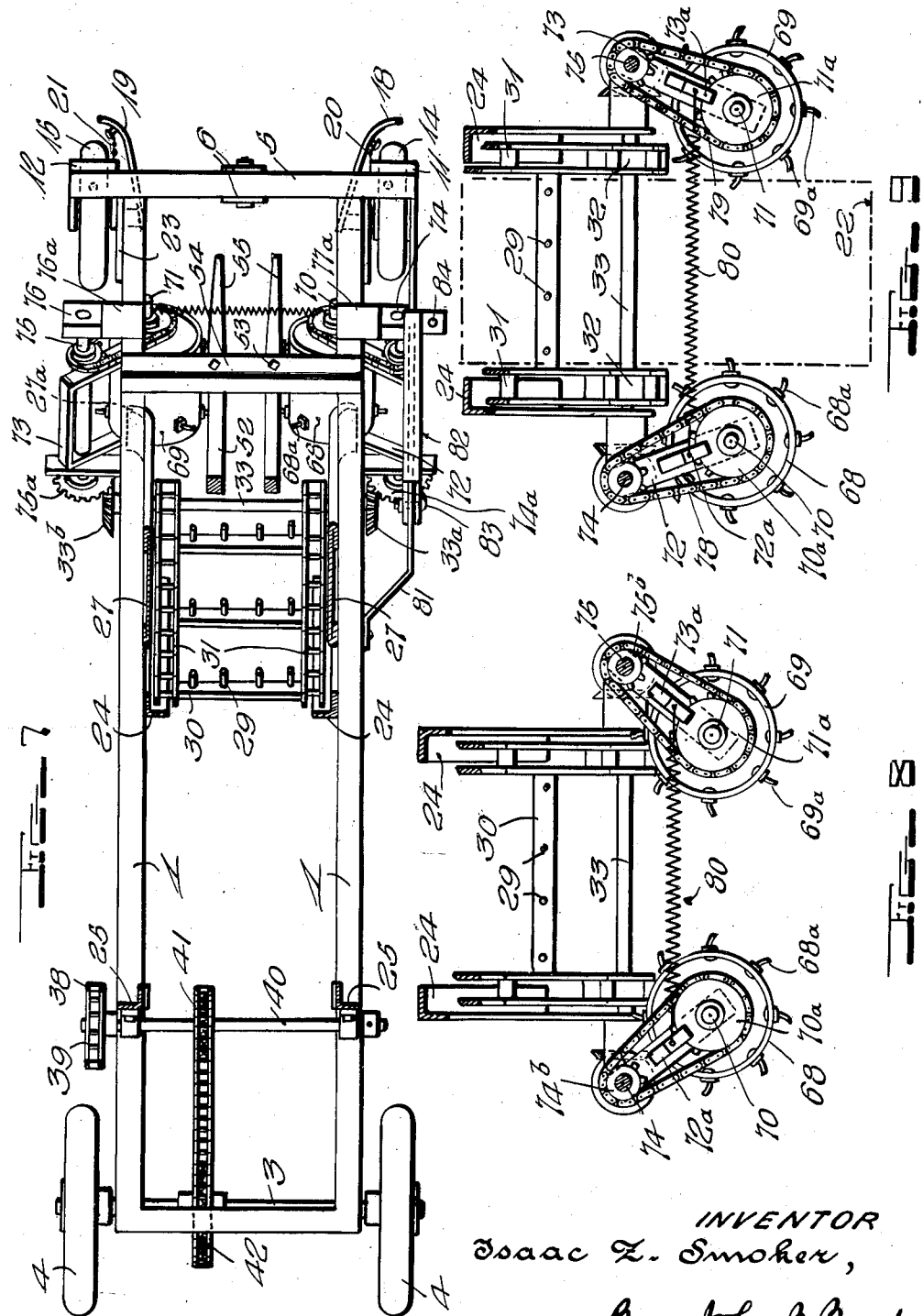
INVENTOR
Isaac Z. Smoker,
By John B. Brady
ATTORNEY April 2, 1946.   I. Z. SMOKER   2,397,570
BALE LOADER
Filed Sept. 5, 1944   5 Sheets-Sheet 5
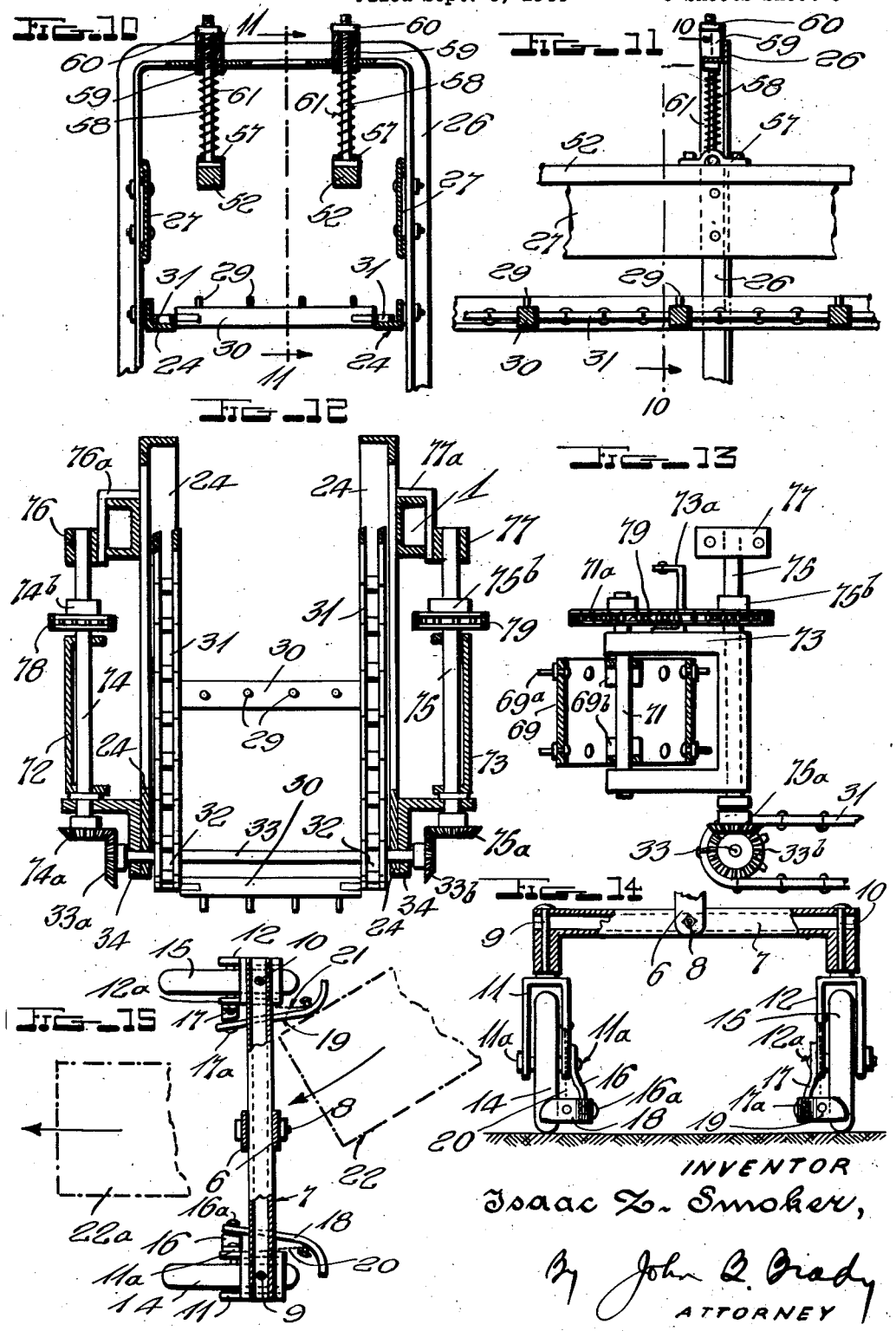

Patented Apr. 2, 1946

2,397,570

UNITED STATES PATENT OFFICE 2,397,570

BALE LOADER

Isaac Z. Smoker, Intercourse, Pa.

Application September 5, 1944, Serial No. 552,737

6 Claims. (Cl. 198—9)

My invention relates broadly to bale loaders and more particularly to an improved construction of bale loader particularly applicable for use with automatic balers.

One of the objects of my invention is to provide an improved construction of bale loader having a wheel supported chassis arranged to bridge the formed bales deposited in the field from the automatic baler and automatically center and guide the bales into position in which the bales may be engaged by the bale loading mechanism and elevated for loading in a truck.

Another object of my invention is to provide a bale loader which is mounted upon a chassis, the bale loading mechanism being symmetrically disposed and substantially balanced in stable equilibrium, and readily capable of being propelled and/or pulled over a field where the terrain may be relatively uneven.

Still another object of my invention is to provide a construction of bale loader which includes a chassis construction mounted upon a wheeled support having means for centering and guiding bales from the field into the bale loading mechanism for elevation thereby into loading position.

Still another object of my invention is to provide a construction of bale loader having a rear wheel drive for simultaneously driving the bale gripping means, the bale elevating means and the bale discharging means in coordinated arrangement.

Still another object of my invention is to provide a construction of bale loader having an improved construction of bale discharge chute at the top of the bale loader and which is capable of angular adjustment to meet various conditions.

Other and further objects of my invention reside in the compact and practical construction of bale loader set forth more fully in the specification hereinafter following by reference to the accompanying drawings in which:

Figure 1 is a side elevational view of the improved bale loader of my invention; Fig. 2 is a top plan view of the bale loader illustrated in Fig. 1; Fig. 3 is a vertical sectional view through the bale loader taken substantially on line 3—3 of Fig. 2 on a somewhat enlarged scale; Fig. 4 is a transverse vertical sectional view through the bale loader taken on line 4—4 of Fig. 3; Fig. 5 is a fragmentary elevational view of the rear of the bale loader showing the rear drive which I provide for simultaneously driving the elevating conveyor and the discharge roll of the bale loader; Fig. 6 is a top plan view of a fragmentary portion of the top of the bale loader showing the arrangement of the discharge roll, the guide means at the top of the bale loader and the adjustable chute which directs the bales into the truck being loaded; Fig. 7 is a horizontal sectional view taken substantially on line 7—7 of Fig. 3; Fig. 8 is a detailed plan view of the bale pick-up mechanism and showing the arrangement thereof with respect to the bale elevating conveyor, the view being taken to show the position of the bale pick-up mechanism prior to the engagement of a bale by the mechanism; Fig. 9 is a view similar to the view shown in Fig. 8 but illustrating the position of the bale pick-up mechanism after the bale has been engaged and while the bale is being moved upward along the bale elevating conveyor; Fig. 10 is a transverse fragmentary sectional view through the bale elevating conveyor and showing the guide mechanism which maintains the bale in engagement with the bale elevating conveyor, the view being taken substantially on line 10—10 of Fig. 11; Fig. 11 is a fragmentary longitudinal sectional view through the bale elevating conveyor taken substantially on line 11—11 of Fig. 10; Fig. 12 is a transverse sectional view through the bale elevating conveyor and the operating mechanism of the bale pick-up means taken substantially on line 12—12 of Fig. 3; Fig. 13 is a transverse sectional view through the bale pick-up mechanism taken substantially on line 13—13 of Fig. 3; Fig. 14 is a front elevational view partially in section showing the supporting means for the front wheel of the bale loader by which the bale loader may operate over relatively uneven terrain without substantially disturbing the equilibrium of the bale loader mechanism and illustrating the guide means adjacent each of the front wheels for centering and guiding a bale into the bale pick-up mechanism for engagement by the bale elevating conveyor; and Fig. 15 is a fragmentary plan and transverse sectional view of the front wheel structure by which the bales are centered and directed into the bale pick-up mechanism for elevation by the bale elevating conveyor; Fig. 16 represents a draw-bar mechanism associated with the chassis of the bale loader.

My invention is directed to an improved construction of bale loader which is practical in manufacture and production at relatively low expense on a mass production scale. The bale loader of my invention has a four-wheel chassis elevated at such a height above the field that the chassis may be pulled over a line of bales which have been formed and discharged into the field by an automatic baler. The chassis of the bale loader may be pulled behind the automatic baler which is being pulled by a tractor or the chassis of the bale loader may be directly pulled by a tractor. The parts of the bale loader are more symmetrically arranged on the chassis of the bale loader in balanced arrangement. The masses of the parts of the bale loader are so distributed that the center of equilibrium is maintained low in the chassis for reducing as much as possible any tendency of tipping of the bale loader under the very substantial weights of the bales which is encountered in actual operation. The front wheeled support is pivotally mounted with respect to the chassis, allowing the front wheels to be adjusted to relatively uneven terrain without substantial tilting of the bale loader so that the the bale loader is at all times maintained in a state of substantially balanced equilibrium irrespective of rough or uneven terrain over which the loader moves. Each of the front wheels is provided with a special bale guiding device to facilitate the alignment and centering of the bales which may be deposited in the field in haphazard arrangement from the automatic baler to enable the bales to be directed substantially longitudinal of the bale pick-up mechanism with the longitudinal axis of the bales substantially coincident with the longitudinal axis of the bale elevating conveyor. The bale guide and directing means associated with the front wheels directs the bales to the bale pick-up mechanism where the bales are yieldably engaged at each side thereof and elevated onto the bale elevating conveyor. To facilitate this lifting operation the bale pick-up means are disposed at an angle to the chassis and on axes which are substantially normal to the plane of the bale elevating conveyor. The bales are engaged by the bale elevating conveyor and carried to a top platform structure. The top platform is provided with an angularly adjustable discharge chute over which the bales are directed to the truck which receives the bales. The bales are continuously pressed into engagement with the bale elevating conveyor by spring guide means suspended from frame structure carried by the chassis. The mechanism of the bale loader is driven from the rear axle of the chassis through chain and sprocket connections which serve to drive the bale elevating conveyor and a bale discharge roll intermediate the top of the bale elevating conveyor and the top delivery platform of the bale loader. Additional chain and sprocket drives are provided between the lower end of the bale elevating conveyor and the bale pick-up mechanism.

Referring to the drawings in more detail reference character 1 designates the chassis of the bale loader which is mounted upon a four-wheeled support at such an elevation as will readily maintain the bale pick-up mechanism in a position to engage the bales as they are distributed over the field. The chassis 1 is provided with rear wheel supports 2 which provide journals for rear axle 3 on which rear wheels 4 are mounted. The front of the chassis is provided with a front frame bar 5 having a center support 6 depending therefrom for pivotally mounting the front wheel support 7 as shown more clearly in Figs. 14 and 15. The center support 6 has a pivotal connection 8 with the front wheel support 7. The ends of the front wheel support 7 are each provided with vertical pivot members 9 and 10 which carry yokes 11 and 12. Yokes 11 and 12 each support journals 11a and 12a for the front wheels 14 and 15. The journals extend somewhat rearwardly from the front of the chassis for increasing the stability and equilibrium of the bale loader.

Each pivoted yoke 11 and 12 provides supporting means for the bale guiding, centering and directing means comprised by links 16 and 17 which depend from the journals 11a and 12a of the yokes and provide pivotal mounting means for the guide members 18 and 19. The guide members 18 and 19 diverge outwardly from pivotal connections 16a and 17a with depending links 16 and 17 and are curved at their outer extremities for engaging bales which may be haphazardly distributed over the field for imparting sufficient angular twisting forces thereto as to angularly shift the bales into a position in which the longitudinal axis of the bales coincides with the longitudinal axis of the bale loader as the bale loader moves along the field. The guide members 18 and 19 are suspended by flexible chains 20 and 21 extending between positions on yokes 11 and 12, respectively, to the guide members. The degree of elevation of the guide members 18 and 19 may be adjusted by shortening or lengthening chains 20 and 21 for most effectively engaging, centering and directing the bales as indicated, for example, in Fig. 15 where the bale 22 is encountered as the bale loader moves over the field and tends to twist the bale into aligned position represented at 22a.

The chassis is provided with downwardly depending guide members 23 adjacent the front thereof which maintain the front wheel support 7 in a normal position with respect to the longitudinal axis of the bale loader and serve as guide means as the front wheel support 7 rocks in angular direction as the bale loader encounters uneven terrain. The wheel support 7 is free to twist about pivot 8 in center support 6 within limits imposed by abutment of either end of front wheel support 7 with the under surface of chassis 1. Throughout this angular movement there is no rearward or forward displacement of front wheels 14 and 15, but merely a rocking movement thereof as one wheel may be elevated at a level different from the other wheel.

Directly behind the centering, directing and guiding mechanism heretofore explained, I arrange the bale pick-up mechanism. The bale pick-up mechanism is supported on frame members which are erected on the chassis 1. I have shown the principal frame member at 24 disposed at an angle of approximately 45 degrees and extending from chassis 1 to frame members 25 erected vertically on chassis 1. The vertically extending frame members 25 and the angularly disposed frame members 24 are interconnected by a substantially U-shaped frame member 26 adjacent their upper extremities. The U-shaped frame member 26 has the side portions thereof arranged to support the upper portions of the side plates 27 which serve the channel or guide ways for the bales as the bales are elevated by the endless bale elevating conveyor 28. The side plates 27 are also supported at their extremities by the upper ends of frame members 25. The lower portions of the side plates 27 are supported by the inner portions of the chassis 1. The lower extremities of side plates 27 are curved outwardly as represented at 27a to facilitate guiding of the bales as they leave the bale pick-up mechanism and as they are directed upwardly along the bale elevating conveyor. The bales which are directed between the channelway formed by the side plates 27 are engaged by the spikes 29 which are carried by the transverse bars 30 interconnected at opposite ends thereof by sprocket chains 31 and constituting the endless conveyor 28. The sprocket chains 31 are engaged over sprocket wheels 32 carried on shaft 33 journaled in brackets 34 supported by the lower end of frame members 24. The upper end of the endless conveyor operates over sprocket wheels 35 carried by shaft 36 journaled in bearings carried adjacent the upper end of frame members 25. The endless conveyor has the sprocket chains thereof and the transverse bars 30 supported by the angular portions of the frames 24 continuous throughout the movement thereof under loaded conditions while the returning side of the endless conveyor is free to slacken off as indicated at 28a in Figs. 1 and 3. The drive for the bale elevating conveyor is provided by shaft 37 which is journaled in bearings carried by frame 25. Shaft 37 contains gear 37a which meshes with gear 36a carried by shaft 36 for driving the bale elevating conveyor. Shaft 37 has sprocket 37b on one end thereof which is engaged by sprocket chain 38 driven from sprocket wheel 39 carried by countershaft 40 which is journaled in bearings carried by frame 25. Shaft 40 has sprocket wheel 41 thereon which is driven by the main drive chain 42 which operates over sprocket wheel 43 carried by rear axle 3 of the wheeled support. Thus rotative movement is imparted to the sprocket system which is driven through the several sprocket chains as the bale loader is pulled over the field.

In addition to the driving of the bale pick-up mechanism through movement imparted to the bale elevating conveyor, I also provide means for driving the bale discharge roll simultaneously with the operation of the bale elevating conveyor. The bale discharge roll is carried by shaft 44 and journaled in bearings mounted on the frame members 45 which extend normal to the vertically extending frame members 25. The frame members 45 constitute the support for the platform upon which the bales are discharged from the upper end of the bale elevating conveyor. The bale discharge roll is shown at 46 carried by shaft 44. Roll 46 is provided with a plurality of longitudinally extending bale engaging ribs 46a which engage the bales as the bales emerge over the top of the endless conveyor and move the bales onto the discharge platform 47. The shaft 44 of the bale discharge roll is driven through sprocket 44a which is engaged by sprocket chain 48 driven by sprocket wheel 36b carried by drive shaft 36.

The platform 47 is shaped at the edge thereof as represented at 47a to retain the discharge bales in position while the bales are being oriented as represented in Fig. 6 and directed into the vehicle or truck to be loaded. The bale is indicated in Fig. 6 at 22c after it is discharged under control of roll 46 and under the guidance of the resilient guide member 49. Resilient guide member 49 is adjustably mounted at one end adjacent the side wall 27 of the bale guideway as represented at 50 and is free to be angularly adjusted with respect to the bale discharge platform 47 under control of the resilient clip member 51 for most effectively guiding the bales as they are discharged from the top of the conveyor.

In order to insure the effective operation of the endless bale elevating conveyor on the bales, I provide means for continuously urging the bales into engagement with the spikes 29 of the conveyor. The means comprises a pair of longitudinally extending guide bars 52 which are suspended adjacent their lower ends by bolt members 53 which extend through the transverse supporting bar 54 mounted on chassis 1. The bars 52 have spring extensions 55 thereon which serve to guide the bales onto the endless conveyor at the lower end of the elevator. At the upper ends of the bars 52, spring members 56 are attached which tend to direct the bales against the discharge roll 46 and facilitate the guiding of the bales onto the top platform 47. The bars 52 are each provided with members 57 adjacent the upper ends of the bars 52 which serve as confining and pivoting means for the heads of the suspension links 58. Suspension links 58 pass through bushing members 59 which are supported by frame 26 and are confined at the ends thereof by nuts 60 which engage screw threaded portions of links 58. Coil springs 61 are disposed between the ends of bushings 59 and members 57 tending to continuously urge bars 52 to positions yieldably engaging the bales as they travel upwardly on the endless conveyor for maintaining the bales into engagement with the spikes 29. The bars 52 may be adjusted toward or away from the bales by rotating nuts 60 on bolts 58.

The bales are delivered to the top platform 47 preparatory to discharge into a vehicle, car or truck as heretofore explained. Immediately adjacent platform 47 I provide an adjustable chute 62 which is hinged at its under-surface to the support 45 for platform 47 as represented at 63. The chute 62 is curved downwardly at one edge as indicated at 62a and is curved upwardly at its opposite edge as represented at 62b. A lug 64 projecting from the lower surface of chute 62 provides a pivotal connection for link 65 which may be supported in differently spaced apertures 66 in the diagonally extending member 67 which forms a brace between vertically extending frame member 25 and horizontally extending frame members 45. The proper angular inclination for chute 62 may thus be selected in order to more efficiently direct the bales from the top platform 47 into the vehicle, car or truck. When the bale loader is not in use the chute 62 may be dropped by disconnecting the supporting link 65 from the brace 67 for thus reducing the effective transverse space which is required by the bale loader.

The bale pick-up mechanism is mounted as heretofore explained directly behind the bale centering, guiding and directing mechanism at the front of the bale loader and comprises a pair of continuously driven cylindrical drums 68 and 69 which are journaled on opposite sides of the bale entrance position and are mounted to be yieldably displaced transversely of the bale loader. Each of the cylindrical drums 68 and 69 have spikes 68a and 69a thereon which engage opposite sides of the bale 22 and pick the bale up and move the bale into engagement with the bale elevating conveyor. The cylindrical drums 68 and 69 are each carried by shaft members 70 and 71, respectively, which are keyed to diametrically extending supporting bars represented, for example, at 69b in Fig. 13 for effecting rotation of the cylindrical drum as the shaft on which the drum is carried is rotated. Shafts 70 and 71 are journaled in angularly swingable yoke-like frames indicated at 72 and 73 which are mounted for angular adjustment about centers formed by shaft members 74 and 75.

The shafts 74 and 75 are journaled at their opposite ends in brackets which extend from the frame members 24 and chassis 1. The same brackets 34 which provide journaling means for transverse shaft 33 of the endless belt conveyor also serve as bearing means for the lower ends of shafts 74 and 75. The shaft 33 is provided with bevel gears 33a and 33b at opposite ends thereof which engage with bevel gears 74a and 75a on the lower ends of shafts 74 and 75. The upper ends of shafts 74 and 75 are supported in bearings 76 and 77 supported by brackets 76a and 77a secured to chassis 1. The shafts 74 and 75 are mounted at an angle of substantially 45 degrees with respect to the horizontal plane of the chassis for thereby maintaining the cylindrical drums of the pick-up mechanism in such angular positions as will enable the bales 22 to be engaged by the spikes 68a and 69a and lifted onto the spikes 29 of the endless belt conveyor. The shafts 74 and 75 are each continuously driven from the bevel gears 33a—74a and 33b—75a and continuously drive sprockets 74b and 75b thereof. Sprockets 74b and 75b are connected through sprocket chains 78 and 79 with sprocket wheels 70a and 71a on shafts 70 and 71. It will be observed that sprocket wheels 70a and 71a are approximately twice the size of sprocket wheels 74b and 75b for reducing the peripheral velocity of the cylindrical drums 68 and 69 to a rate at which the bales can be normally engaged as the bale loader is drawn along the field. The bale pick-up mechanism comprised by the cylindrical drums 68 and 69 is continuously urged to a position tending to embrace and engage the bales through spring means 80 attached at opposite ends to brackets 72a and 73a carried by the angularly swingable frames 72 and 73. The normal position of the rotatable cylindrical drums 68 and 69 is represented in Figs. 2, 7 and 8 preparatory to the engagement of a bale. In Fig. 9 I have shown the manner in which the swingable frames 72 and 73 are somewhat separated or spread by the interposition and engagement of a bale between the bale pick-up means preparatory to engagement of the bale by the spikes 29 of the bale elevating conveyor 28. Thus the bale pick-up mechanism is continuously driven from the main drive of the bale loader through the bale elevating conveyor for continuously picking up bales which are centered and directed through the centering, guiding and directing mechanism 18—19 for elevation by the bale elevating conveyor for discharge over the platform 47 and chute 62 of the vehicle, car or truck.

To facilitate the propulsion of the bale loader adjacent an automatic baler or through the agency of a separate tractor, I provide a draw-bar mechanism adjacent one side of chassis 1 as represented in Fig. 16. The draw-bar mechanism includes frame member 81 secured at one end of the side of chassis 1 and at the other end to front frame bar 5. A hinged draw-bar 82 is pivotally connected at 83 through apertured portion 81a of frame member 81 or at any one of the apertured portions 81b, 81c or 81d of frame member 81. Thus hinged draw-bar 82 is adjustable longitudinally of the chassis 1. The end of the draw-bar 82 terminates in an apertured tongue 84 which may be connected to the automatic baler or separate tractor for moving the bale loader through the field.

The construction of bale loader shown herein has been found to be very practical for manufacture and production. I realize that improvements in specific detail and arrangement of parts may suggest themselves to those skilled in the art and I do not intend that my invention be limited to the exact construction shown, but desire that it be understood that modifications may be made and I intend no limitations upon my invention other than may be imposed by the scope of the appended claims.

What I claim and desire to secure by Letters Patent of the United States is as follows:

1. In a bale loader, a chassis, a wheeled support for said chassis including independently pivoted front wheel supports, wheels journaled in said supports, bale pick-up mechanism carried by said chassis, a guide bar pivotally mounted adjacent the inner face of each of said front wheel supports, and angularly shiftable with the independent orientation of each of said wheel supports, said guide bars being curved around the front of said wheels for directing, centering and guiding a bale between the wheels and into the bale pick-up mechanism as the bale loader approaches over the bale.

2. In a bale loader, a chassis, a wheeled support for said chassis including independently pivoted front wheel supports, wheels journaled in said supports, bale pick-up mechanism carried by said chassis, a guide bar pivotally mounted at one end adjacent the inner face of each of said front wheel supports and angularly shiftable according to the independent orientation of each of the associated wheel supports, flexible means extending between positions adjacent the opposite ends of said pivotally mounted guide bars and said wheel supports, the respective flexible means being connected at one end to the associated guide bar and at the other end to the associated wheeled support for maintaining said guide bars slightly above the tread of said wheels, said guide bars being curved around the front of said wheels for directing, centering and guiding a bale between the wheels and into the bale pick-up mechanism as the bale loader approaches over the bale.

3. In a bale loader, a chassis, a wheeled support for said chassis including independently pivoted front wheel supports, wheels journaled in said supports, bale pick-up mechanism carried by said chassis, a guide bar pivotally mounted at one end adjacent the inner face of each of said front wheel supports and angularly shiftable according to the independent orientation of each of the associated wheel supports, chains extending from said wheel supports to positions adjacent the opposite ends of said guide bars for suspending said guide bars in positions immediately above the traction surface of said wheels, said guide bars being curved around the front of said wheels for directing, centering and guiding a bale between the wheels and into the bale pick-up mechanism as the bale loader approaches over the bale.

4. In a bale loader, a chassis, a wheeled support for said chassis, bale pick-up mechanism, bale elevating mechanism and bale discharge mechanism, means for simultaneously driving all of said mechanisms from said wheeled support, a platform for receiving bales discharged from said bale discharge mechanism, guide means associated with said platform for orienting the bales as they are discharged from said bale discharge mechanism and an angularly adjustable chute aligned with said guide means and hingedly connected with said platform, an adjustable link hingedly connected at one end with the under surface of said chute and engageable at the opposite end with spaced positions on said wheeled support for maintaining said chute in selected angular positions for directing bales at selected angular inclinations from said platform.

5. A bale loader comprising a chassis, a wheeled support for said chassis, bale pick-up mechanism, bale elevating mechanism, means supporting said mechanisms from said chassis, a vertically extending frame carried by said chassis, a platform supported by said frame into position adjacent the discharge end of said bale elevating mechanism, a discharge roll intermediate the discharge end of said bale elevating mechanism and said platform, means for simultaneously driving all of said mechanisms from said wheeled support, bale guiding means associated with said platform and said discharge roll for orienting a bale delivered from the discharge end of said bale elevating mechanism and an angularly adjustable chute connected with said platform and supported by said vertically extending frame in selectively adjustable positions for receiving the oriented bales from said platform and discharging the bales at selected angular inclinations from said chute.

6. A bale loader comprising a chassis, a two-wheeled support at one end of said chassis, a transverse frame centrally pivoted at the other end of said chassis, guide means extending from the last mentioned end of said chassis and bearing against said frame for restricting movement of said frame to angular motion in a vertical plane about the pivotal connection of said frame with said chassis, independently pivoted wheel supports adjacent each end of said frame, wheels journaled in each of said wheel supports, guiding, centering and directing means carried by the intermediate portions of each of said wheel supports adjacent the wheels which are journaled therein, bale pick-up mechanism carried by said chassis in a position behind said guiding, centering and directing means, a bale elevating conveyor supported by said chassis behind said bale pick-up mechanism, a bale discharge roll mounted with respect to said chassis adjacent the discharge end of said bale elevating conveyor, means operated from said two-wheeled support for simultaneously driving said bale pick-up mechanism, said bale elevating conveyor and said bale discharge roll.

ISAAC Z. SMOKER.